United States Patent
Qiu et al.

(10) Patent No.: US 9,395,184 B2
(45) Date of Patent: Jul. 19, 2016

(54) RESONANT FIBER OPTIC GYROSCOPE WITH POLARIZING CRYSTAL WAVEGUIDE COUPLER

(71) Applicant: Honeywell International Inc., Morristown, NJ (US)

(72) Inventors: Tiequn Qiu, Glendale, AZ (US); Glen A. Sanders, Scottsdale, AZ (US); Lee K. Strandjord, Tonka Bay, MN (US)

(73) Assignee: Honeywell International Inc., Morris Plains, NJ (US)

( * ) Notice: Subject to any disclaimer, the term of this patent is extended or adjusted under 35 U.S.C. 154(b) by 164 days.

(21) Appl. No.: 14/461,680

(22) Filed: Aug. 18, 2014

(65) Prior Publication Data

US 2016/0047655 A1    Feb. 18, 2016

(51) Int. Cl.
*G01C 19/72*    (2006.01)
*G02B 6/28*    (2006.01)

(52) U.S. Cl.
CPC .............. *G01C 19/727* (2013.01); *G01C 19/72* (2013.01); *G01C 19/721* (2013.01); *G02B 6/2843* (2013.01)

(58) Field of Classification Search
CPC .... G01C 19/72; G01C 19/721; G01C 19/727; G02B 6/2843
See application file for complete search history.

(56) References Cited

U.S. PATENT DOCUMENTS

| 4,697,876 | A * | 10/1987 | Dyott | C03B 37/027 250/227.17 |
|---|---|---|---|---|
| 6,463,195 | B1 * | 10/2002 | Sasaki | G02B 6/2835 385/43 |
| 7,106,448 | B1 | 9/2006 | Vawter et al. | |
| 8,098,380 | B2 | 1/2012 | Sanders et al. | |
| 8,823,946 | B1 * | 9/2014 | Logan, Jr. | G01C 19/64 356/462 |
| 2002/0051133 | A1 * | 5/2002 | Honda | G01C 19/727 356/461 |

(Continued)

FOREIGN PATENT DOCUMENTS

EP    0092831    2/1983

OTHER PUBLICATIONS

European Patent Office, "Extended European Search Report from EP Application No. 15180436.6 mailed Jan. 20, 2016", "from Foreign Counterpart of U.S. Appl. No. 14/461,680", Jan. 20, 2016, pp. 1-7, Published in: EP.
Aschieri, Pierre et al., "Highly Efficient Coupling in Lithium Niobate Photonic Wires by the Use of a Segmented Waveguide Coupler", Jul. 12, 2011, pp. 3885-3888, vol. 50, No. 21, Publisher: Applied Optics, Published in: France.

(Continued)

*Primary Examiner* — Michael A Lyons
(74) *Attorney, Agent, or Firm* — Fogg & Powers LLC (57) ABSTRACT

Systems and methods for a resonant fiber optic gyroscope with a polarizing crystal waveguide coupler are provided. In one embodiment, an optical fiber resonator comprises: a polarizing single crystal material having a first crystal lattice axis; a first waveguide formed in the crystal material; a second waveguide formed in the crystal material running parallel to the first waveguide; and an optical fiber sensing coil. The first waveguide comprises a bend that approaches the second waveguide defining a coupling region between the first and second waveguides. The first and second waveguides are polarized to guide light having a polarization state aligned to the first crystal lattice axis. The second waveguide and the sensing coil are coupled into a resonator configuration forming a ring resonator, the second waveguide comprising a first port coupled to a first end of the coil, and a second port coupled to a second end of the coil.

20 Claims, 4 Drawing Sheets (56) References Cited

U.S. PATENT DOCUMENTS

2009/0219545 A1    9/2009  Feth
2010/0027022 A1*   2/2010  Thorland ............. G01C 19/721
                                                            356/461
2014/0044142 A1    2/2014  Strandjord et al.
2014/0132961 A1    5/2014  Tazartes et al.

OTHER PUBLICATIONS

Sanders, G.A. et al., "Resonator Fiber-Optic Gyro Using LINBO3 Integrated Optics At 1.5-UM Wavelength", Sep. 6, 1988, pp. 1-2, vol. 0985, Publisher: Honeywell Systems and Research Center, Published in: US.

\* cited by examiner

RESONANT FIBER OPTIC GYROSCOPE WITH POLARIZING CRYSTAL WAVEGUIDE COUPLER

BACKGROUND

In the operation of a resonant fiber optic gyroscope (RFOG), it is desirable to lock the frequencies of the laser light sources to the resonance frequencies of the fiber optic ring resonator using high bandwidth electronic servos. Currently, that can be achieved by using a reflection port detector signal from the resonator because signals from the reflection port have a high speed response to frequency changes in the light from the laser light sources. The output signal from a reflection port includes light coming directly from the laser and also includes light coming from the output of the resonator coil. In contrast, the output signal from a transmission port only includes light which has circulated through the resonator coil. For this reason, light from the reflection port has a much faster response to changes in optical frequency compared to light from the transmission port. Further, because the output of the transmission port only includes light that has propagated through the resonator coil, the light from the transmission port will not include light having spatial or polarization mode mismatch or cross coupling, which create biases that may lead to rotation rate measurement errors. In contrast, the output of the reflection port in RFOGs today does include a component of light having a polarization that does not match the Eigen-state of polarization (ESOP) in the resonator, causing resonance lineshape asymmetry, and leading to bias errors that make it unsuitable for obtaining rotation rate measurements made at the reflection port.

For the reasons stated above and for other reasons stated below which will become apparent to those skilled in the art upon reading and understanding the specification, there is a need in the art for systems and methods to reduce or eliminate resonance asymmetry at the reflection port of an RFOG.

SUMMARY

The Embodiments of the present invention provide methods and systems to reduce or eliminate resonance asymmetry at an RFOG reflection port and will be understood by reading and studying the following specification.

In one embodiment, an optical fiber resonator is provided. The resonator comprises: a polarizing single crystal material having a first crystal lattice axis; a first waveguide formed in the polarizing single crystal material; a second waveguide formed in the polarizing single crystal material running parallel to the first waveguide; and an optical fiber sensing coil; wherein the first waveguide comprises a bend that approaches the second waveguide defining a coupling region between the first waveguide and the second waveguide; wherein the first waveguide and second waveguide are polarized to guide light having a polarization state aligned to the first crystal lattice axis; wherein the second waveguide and the optical fiber sensing coil are coupled into a resonator configuration to form a ring resonator, the second waveguide comprising a first port coupled to a first end of the optical fiber sensing coil, and a second port coupled to a second end of the optical fiber sensing coil.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for resonator fiber optic gyroscopes that eliminate unwanted polarization states and spatial modes from the output signal of a resonator fiber sensor reflection port. Elimination of all but the desired polarization state and spatial mode means that the output signal from the reflection port may be suitable for determining the rotation rate of the optical fiber sensor coil. More specifically, the present disclosure introduces embodiments of resonators for gyroscopes which utilize a crystal waveguide coupler to couple light into, and out of, the optical fiber sensor coil. The crystal waveguide coupler comprises a single crystal material comprising two or more waveguides. The single crystal material results in waveguides that are highly polarizing so that light traveling through the waveguides will be locked to the same polarization state. Further, because the crystalline structure of the material is uniform throughout, the light traveling through the waveguides will share the same single spatial mode, identically aligned within each waveguide to the same axis of the material.

Figure 1:
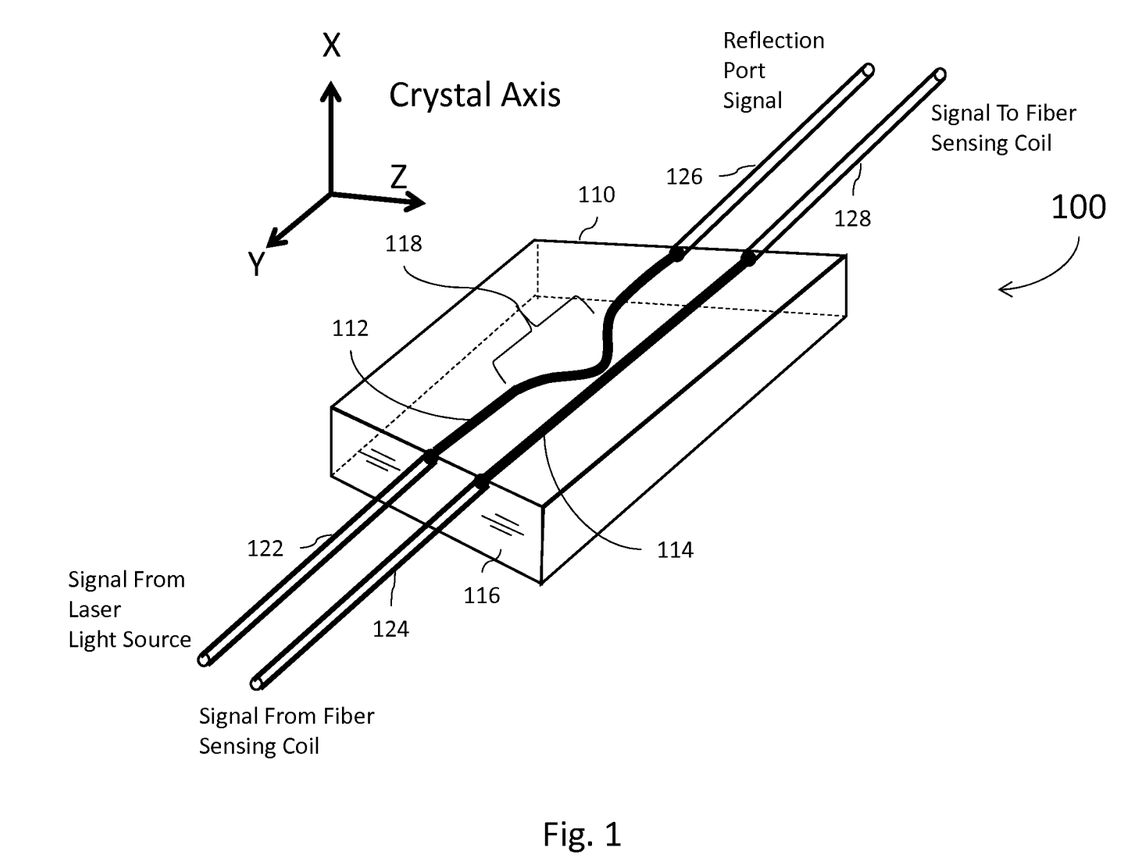
FIG. 1 is a diagram illustrating a crystal waveguide coupler of one embodiment of the present invention.

FIG. 1 is a diagram illustrating a crystal waveguide coupler 110 of one embodiment of the present disclosure, generally at 100. Crystal waveguide coupler 110 comprises a single crystal material suitable for fabricating single-polarization optical waveguides, such as but not limited to a proton exchanged LiNbO$_3$ crystal, for example. In one implementation, a single-polarization optical waveguide may be obtained using a proton exchange process where a LiNbO$_3$ substrate is placed in a melted organic acid, and H+ ions (i.e., protons) replace Li+ ions within the substrates crystal lattice. This yields guidance only for light polarized along the crystal axis of crystal waveguide coupler 110 and provides a very high extinction ratio for light having any non-guided cross polarization. Referring to FIG. 1, polarization in crystal waveguide coupler 110 along the z-axis parallel to the surface of the waveguide is supported by the crystal structure of the material. Polarization of light on the x-axis, normal to the surface of the waveguide, is not supported and light with this position state will quickly lose power within waveguide.

In the embodiment shown in FIG. 1, crystal waveguide coupler 110 comprises two waveguides (shown at 112 and 114). In the context of an embodiment where coupler 110 is used in a resonator fiber optic gyroscope, the first waveguide 112 may be utilized for the guidance of input laser light into the optical fiber sensing coil, and guidance of output laser light out from the optical fiber sensing coil. The second waveguide 114 is then used for the guidance of light circulating through the ring resonator optical path which includes the optical fiber sensing coil and the waveguide portion 114 that connects the two ends of the optical fiber sensing coil. Such embodiments are discussed in greater detail below.

As shown in FIG. 1, one of the waveguides is straight while the other has a bend that forms a coupling region. For crystal waveguide coupler 110, waveguide 112 comprises a bend that approaches waveguide 114 to define a coupling region 118. Within the coupling region 118, a fraction of light propagating through waveguide 112 will be coupled into waveguide 114. Similarly, a fraction of light propagating through waveguide 114 will be coupled into waveguide 112. Because both waveguides 112 and 114 are formed in the same piece of crystal material, the principal axes of the two waveguides are identical, and light beams traveling though these waveguides will also have the same polarization states, which are aligned to the preferred principal axis of the crystal. Alignment of the two light beams exiting waveguides 112 and 114 is guaranteed because the common chip of polarizing crystal material in which both waveguides 112 and 114 are formed only supports one polarization state and only supports one spatial mode.

In one embodiment, light enters crystal waveguide coupler 110 at fiber leads 122 and 124, and exits crystal waveguide coupler 110 at fiber leads 126 and 128. For resonator fiber optic gyroscope applications, the optical loss at the intersection between the fiber optic leads and the crystal waveguide coupler 110 needs to be low, ideally having transmission better than 90%. In addition, reflection of laser light at the entry to waveguides 112 and 114 from respective fiber leads 122 and 124 ideally needs to be minimized. For that reason, the surface 116 of crystal waveguide coupler 110 where light is coupled into waveguides 112 and 114 from respective fiber leads 122 and 124 is at an off-normal angle with respect to the axis of the waveguides. For example, surface 116 is angled to reduce back reflection and optical loss as much as possible. The angle needed to achieve a desired back reflection limit will depend at least on the refractive index of the crystal material of crystal waveguide coupler 110. The surface of coupler 110 at the interface with fiber leads 126 and 128 may be similarly angled.

Figure 2:
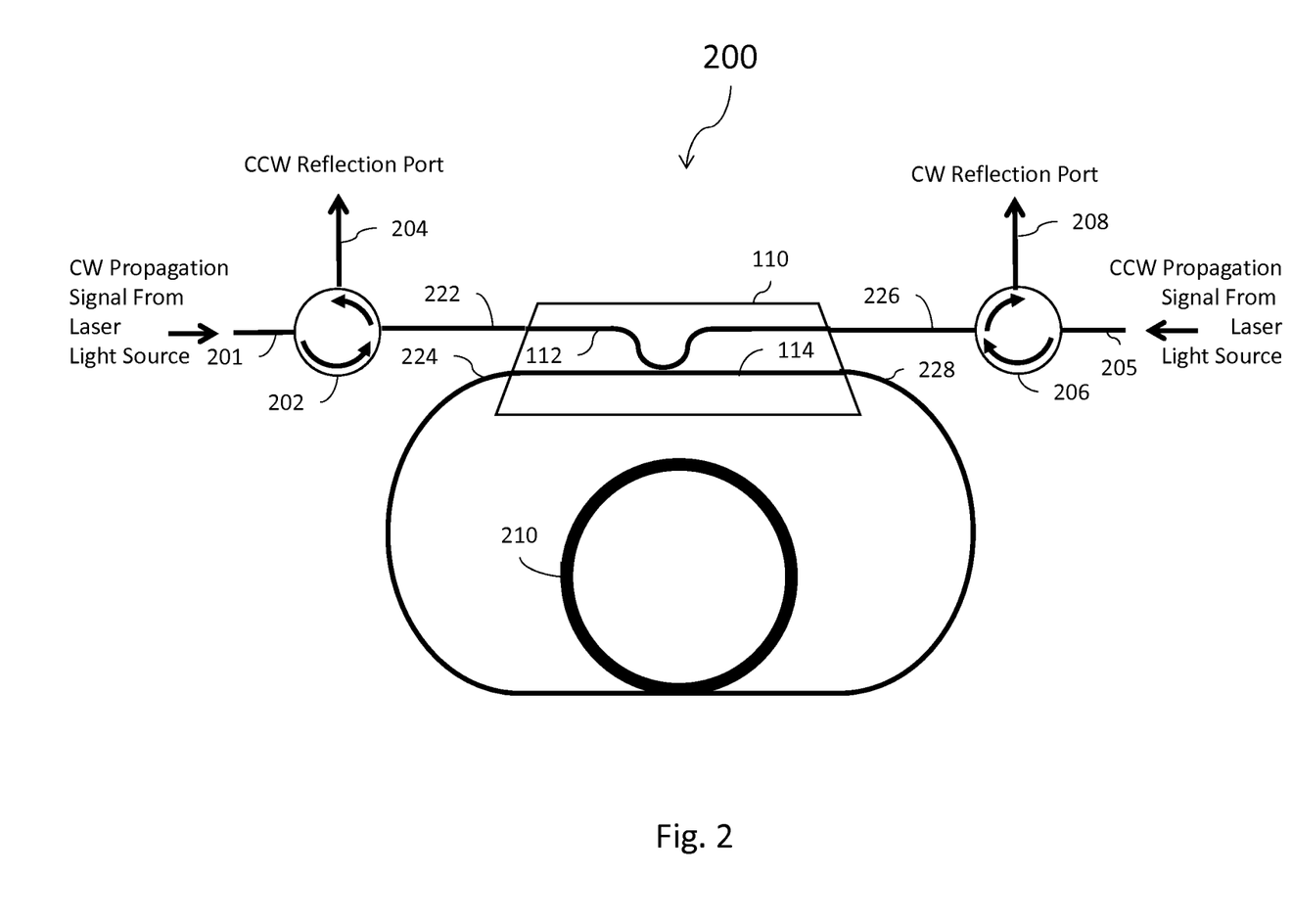
FIG. 2 is a diagram illustrating crystal waveguide coupler in conjunction with an RFOG fiber sensing coil of one embodiment of the present invention.

FIG. 2 is a general diagram of a ring resonator 200 that could be used in a resonator fiber optic gyroscope. In the embodiment illustrated in FIG. 2, crystal waveguide coupler 110 is utilized to couple clockwise (CW) and counterclockwise (CCW) laser light into to an optical fiber sensing coil 210.

With respect to the CW optical path, light from a laser light source 201 is introduced into a circulator 202 from which it exits into a fiber lead 222 coupled to waveguide 112. Most of the light from source 201 enters waveguide 112 and a fraction of it is coupled from waveguide 112 into waveguide 114, while the remaining fraction continues to propagate through waveguide 112 and out of crystal waveguide coupler 110 into fiber lead 226. For the fraction coupled into waveguide 114, light exits fiber lead 228 into the optical fiber coil 210, which comprises a polarization maintaining (PM) fiber. As discussed above, because waveguides 112 and 114 are identically aligned with respect to polarization and spatial mode, the polarization state of the CW laser light entering the ring resonator, which includes the optical fiber coil 210, the waveguide 114 and fiber leads 228 and 224, is the same as the polarization state of light in both waveguides 112 and 114. The polarization state of light exiting from waveguide 114 into the coil 210 is maintained as the light circulates through coil 210. After circulating in the CW direction for the length of coil 210, the light exits coil 210 into fiber lead 224 and back into waveguide 114 where a fraction is coupled back into waveguide 112 and propagates into fiber lead 226. As such, the optical signal leaving of crystal waveguide coupler 110 at fiber lead 226 comprises a combination of light that has passed directly through waveguide 112 from light source 201 and CW propagating light that has traversed completely through the optical fiber resonator. Both of these components are aligned in polarization state and spatial mode with each other. From fiber lead 226, the light signal enters circulator 206 and propagates to the CW reflection port 208.

With respect to the CCW optical path, light from a laser light source 205 is introduced into a circulator 206 from which it exits into fiber lead 226, which is coupled to waveguide. Most of the light from light source 205 enters waveguide 112 and a fraction of it is coupled from waveguide 112 into waveguide 114. The remaining fraction continues to propagate through waveguide 112 and out of crystal waveguide coupler 110 into fiber lead 222. For the fraction coupled into waveguide 114, light exits fiber lead 224 into the optical fiber coil 210. Because waveguides 112 and 114 are identically aligned with respect to polarization and spatial mode, the polarization state of the CCW laser light entering the resonator is the same as the polarization state of light in both waveguides 112 and 114. The polarization state of CCW light exiting from waveguide 114 into the coil 210 is maintained by the PM fiber as the light circulates through coil 210. After circulating in the CCW direction for the length of coil 210, the light exits coil 210 into fiber lead 228 and back into waveguide 114 where a fraction is coupled back into waveguide 112 and propagates into fiber lead 222. As such, the optical signal leaving of crystal waveguide coupler 110 at fiber lead 222 comprises a combination of light that has passed directly through waveguide 112 from light source 205 and CCW propagating light that has traversed completely through the optical fiber resonator. Both of these components are aligned in polarization state and spatial mode with each other. From fiber lead 222, the light signal enters circulator 202 and propagated to the CCW reflection port 204.

Because waveguide 112 and waveguide 114 are aligned in polarization state and also support only one spatial mode, the light reaching the CW reflection ports 204 and 208 does not contain any light from an unwanted spatial mode or polarization state and therefore does not contain any rotation rate bias from these bias sources. It is indicative of the light travelling through coil 210. This makes the light exiting the reflection ports 204 and 208 suitable to be used to determine the rotation rate of the coil sensor. Further, because the light signal is from the reflection ports 204 and 208, it can be used for locking the frequencies of light sources 201 and 205 to the resonance frequencies of the resonator. When the gyroscope is rotating, the CW and CCW laser lightwave, if locked to the resonator resonances, will have a frequency difference induced by the rotation. If the laser light waves are locked onto the same resonance of the resonator, the frequency difference will indicate the rotation rate without influence of the resonator's free spectral range. The resonator free spectral range is the light source frequency change needed to add one more wavelength of optical pathlength within the resonator. Thus, it is the input frequency difference between immediately adjacent resonances of the same spatial and polarization mode.

Figure 3:
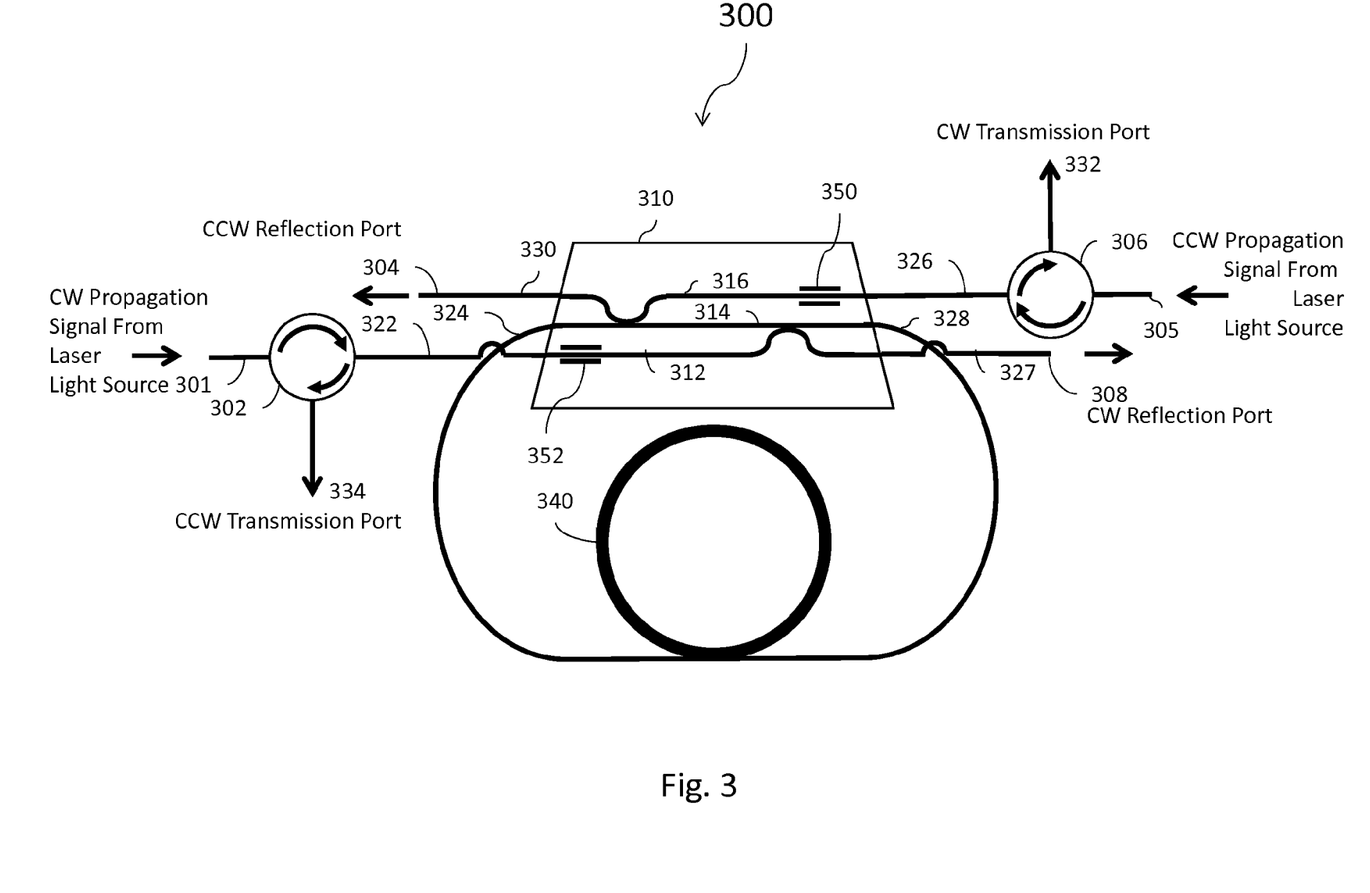
FIG. 3 is a diagram illustrating another embodiment of a crystal waveguide coupler in conjunction with an RFOG fiber sensing coil of one embodiment of the present invention.

FIG. 3 is a diagram illustrating generally at 300 a resonator such as for use in a resonator fiber optic gyroscope. As with the embodiments shown in FIG. 2, in the embodiment illustrated in FIG. 3, crystal waveguide coupler 310 is utilized to couple clockwise (CW) and counterclockwise (CCW) laser light into to an optical fiber resonator. Crystal waveguide coupler 310 comprises the same waveguides as those in FIG. 2, but further comprises at least one additional waveguide so that CW and CCW light are each coupled into coil 340 through independent optical paths.

With respect to the CW optical path, light from a laser light source 301 is introduced into a circulator 302 from which it exits into a fiber lead 322 coupled to waveguide 312. The light from source 301 enters waveguide 312 and a fraction of it is coupled from waveguide 312 into waveguide 314, while the remaining fraction continues to propagate through waveguide 312 and out of crystal waveguide coupler 310 into fiber lead 327. For the fraction coupled into waveguide 314, light exits fiber lead 328 into the optical fiber coil 340, which comprises a polarization maintaining (PM) fiber. Because waveguides 312 and 314 are identically aligned with respect to polarization and spatial mode, the polarization state of the CW laser light entering optical fiber resonator is the same as the polarization state of light in both waveguides 312 and 314. The polarization state of light exiting from waveguide 314 into the coil 340 is maintained as the light circulates through coil 340. After circulating in the CW direction for the length of coil 340, the light exits coil 340 into fiber lead 324 and back into waveguide 314 where a fraction is coupled back into waveguide 312 and propagates into fiber lead 327. As such, the optical signal leaving of crystal waveguide coupler 310 at fiber lead 327 comprises a combination of light that has passed directly through waveguide 312 from light source 301 and CW propagating light that has traversed completely through the optical fiber resonator, both components aligned in polarization state and spatial mode with each other. From fiber lead 327, the light signal propagates to the CW reflection port 308.

With respect to the CCW optical path, light from a laser light source 305 is introduced into a circulator 306 from which it exits into a fiber lead 326 coupled to waveguide 316. The light from source 305 enters waveguide 316 and a fraction of it is coupled from waveguide 316 into waveguide 314, while the remaining fraction continues to propagate through waveguide 316 and out of crystal waveguide coupler 310 into fiber lead 330. For the fraction coupled into waveguide 314, light exits fiber lead 324 into the optical fiber coil 340. Because waveguides 316 and 314 are identically aligned with respect to their polarization and spatial mode, the polarization state of the CCW laser light entering the optical fiber resonator is the same as the polarization state of light in both waveguides 316 and 314. The polarization state of light exiting from waveguide 314 into the coil 340 is maintained by the PM fiber as the light circulates through coil 340. After circulating in the CCW direction for the length of coil 340, the light exits coil 340 into fiber lead 328 and back into waveguide 314 where a fraction is coupled back into waveguide 316 and propagates into fiber lead 330. As such, the optical signal leaving of crystal waveguide coupler 310 at fiber lead 330 comprises a combination of light that has passed directly through waveguide 316 from light source 305 and CCW propagating light that has traversed completely through optical fiber coil 340. Both of these components are aligned in polarization state and spatial mode with each other. From fiber lead 330, the light signal propagates to the CW reflection port 304.

Advantageously, in addition to the CW reflection port 308 and CCW Reflection port 304 outputs, resonator 300 also provides respective CW and CCW transmission ports 332 and 334. CW propagating light which has propagated through coil 340 will couple out of waveguide 314 into waveguide 316 and out of crystal waveguide coupler 310 into fiber lead 326. From fiber lead 326, this signal enters circulator 306, exiting at CW transmission port 332. CCW propagating light which has propagated through coil 340 will couple out of waveguide 314 into waveguide 312 and out of crystal waveguide coupler 310 into fiber lead 322. From fiber lead 322, this signal enters circulator 302, exiting at CCW transmission port 334. Unlike the light output from the reflection ports 308 and 304, all light exiting out from transmission ports 332 and 334 has traversed coil 340. Because waveguide 312, 314 and 316 are aligned by the crystal material of coupler 310 in polarization state and support only one spatial mode, the light signal at the reflection ports 308 and 304 as well as transmission ports 332 and 334 are aligned to each other in polarization state and spatial mode.

Some embodiments of crystal waveguide coupler 110 and crystal waveguide coupler 310 may further include integrated phase modulators (shown at 350 and 352) to phase modulate light within the respective waveguides prior to its coupling into the optical fiber resonance coil 340. In one embodiment, these phase modulators comprise electrodes which apply a voltage across a waveguide to change the waveguide index. These embodiments combine functions of a phase modulator with a polarizing crystal waveguide coupler into a single device which conserves space.

Figure 4:
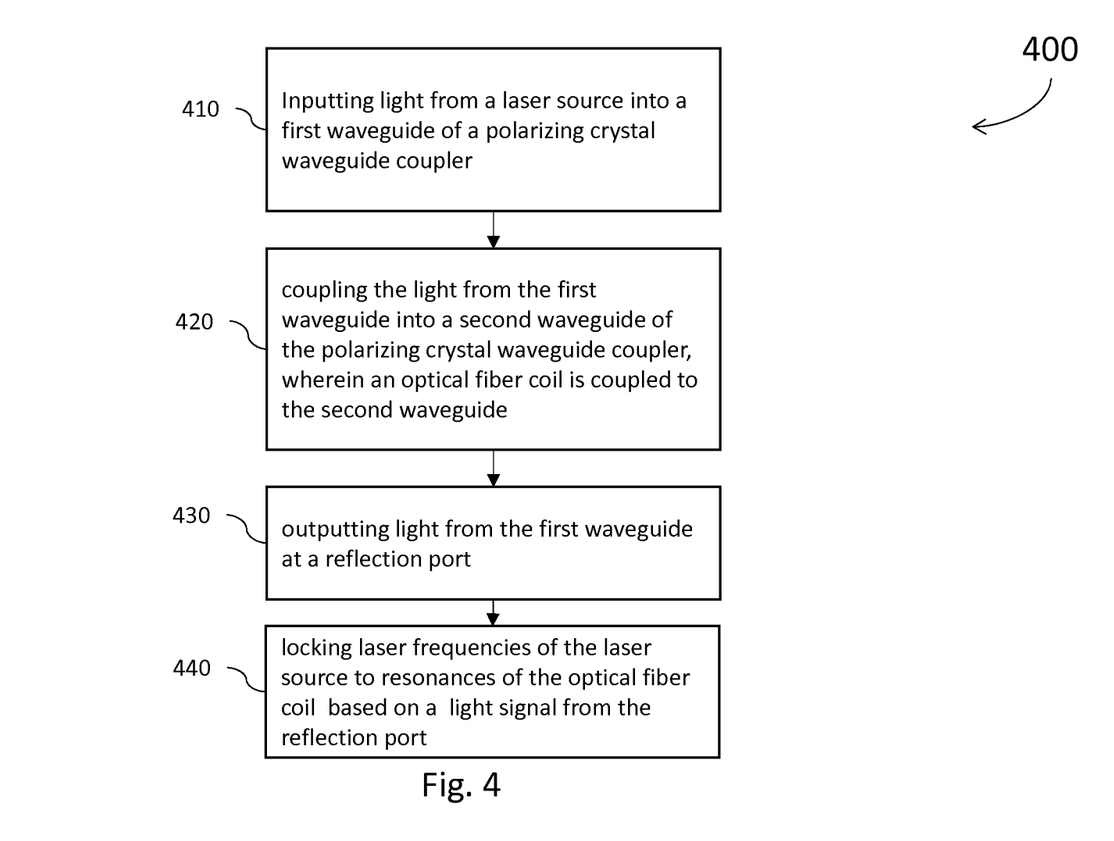
FIG. 4 is a flow chart illustrating a process of one embodiment of the present invention.

The operation of one or more of the above described embodiments may be illustrated by the process 400 shown in FIG. 4. The process begins at 410 with inputting light from a laser source into a first waveguide of a polarizing crystal waveguide coupler. The process proceeds to 420 with coupling the light from the first waveguide into a second waveguide of the polarizing crystal waveguide coupler, wherein an optical fiber coil is coupled to the second waveguide. Because the first and second waveguides are aligned by the crystal material of the coupler in polarization state and support only one spatial mode, the light signal propagating through these waveguides are aligned to each other in polarization state and spatial mode. The method proceeds to 430 with outputting light from the first waveguide at a reflection port. As explained above, the light signal output from the reflection port will comprise a component directly from the light source and a component that has circulated through the coil, but both components will have been aligned in polarization state and spatial mode by the crystal structure of the coupler. The signal from the reflection port, which is free of light from unwanted polarization and spatial modes, can be used by a fast electronic servo (such as a Pound-Drever-Hall loop) to lock the laser frequencies to the resonance. As such, the method proceeds to 440 with locking laser frequencies of the laser source to resonances of the optical fiber coil based on a light signal from the reflection port. A gyro using this method will have advantages of high loop bandwidth without compromising bias performance.

EXAMPLE EMBODIMENTS

Example 1 includes an optical fiber resonator, the resonator comprising: a polarizing single crystal material having a first crystal lattice axis; a first waveguide formed in the polarizing single crystal material; a second waveguide formed in the polarizing single crystal material running parallel to the first waveguide; and an optical fiber sensing coil; wherein the first waveguide comprises a bend that approaches the second waveguide defining a coupling region between the first waveguide and the second waveguide; wherein the first waveguide and second waveguide are polarized to guide light having a polarization state aligned to the first crystal lattice axis; wherein the second waveguide and the optical fiber sensing coil are coupled into a resonator configuration to form a ring resonator, the second waveguide comprising a first port coupled to a first end of the optical fiber sensing coil, and a second port coupled to a second end of the optical fiber sensing coil.

Example 2 includes the resonator of example 1, wherein the polarizing single crystal material comprises a proton exchanged $LiNbO_3$ crystal.

Example 3 includes the resonator of any of examples 1-2, wherein the first waveguide comprises a first interface coupled to a first fiber lead and a second interface coupled to a second fiber lead; and wherein the second waveguide comprises a third interface coupled to a third fiber lead and a fourth interface coupled to a fourth fiber lead.

Example 4 includes the resonator of any of examples 1-3, wherein the first waveguide comprises: a first interface configured to input laser light from a first laser light source into the first waveguide, and a second interface configured to output a first reflection port signal from the first waveguide; wherein frequencies of the laser light from the first laser light source are locked to resonance frequencies of the ring resonator based on the first reflection port signal.

Example 5 includes the resonator of example 4, wherein the optical fiber sensing coil comprises polarization maintaining (PM) fiber; wherein any laser light from the first laser light source propagating through the optical fiber sensing coil has a polarization state aligned to a polarization state of the first reflection port signal.

Example 6 includes the resonator of any of examples 4-5, wherein the second interface of the first waveguide is further configured to input laser light from a second laser light source into the first waveguide, and wherein the first interface of the first waveguide is further configured to output a second reflection port signal from the first waveguide; wherein frequencies of the laser light from the second laser light source are locked to resonance frequencies of the ring resonator based on the second reflection port signal.

Example 7 includes the resonator of example 6, wherein the optical fiber sensing coil comprises polarization maintaining (PM) fiber; wherein any laser light from the second laser light source propagating through the optical fiber sensing coil has a polarization state aligned to a polarization state of the second reflection port signal.

Example 8 includes the resonator of any of examples 1-7, wherein the polarizing single crystal material supports only one polarization state and one spatial mode for light propagating through the first waveguide and the second waveguide.

Example 9 includes the resonator of any of examples 1-8, further comprising: a third waveguide formed in the polarizing single crystal material, wherein the third waveguide comprises a bend that approaches the second waveguide defining a coupling region between the third waveguide and the second waveguide.

Example 10 includes the resonator of example 9, wherein the third waveguide comprises: a first interface configured to input laser light from a second laser light source into the third waveguide, and a second interface configured to output a second reflection port signal from the third waveguide; wherein frequencies of the laser light from the second laser light source are locked to resonance frequencies of the ring resonator based on the second reflection port signal.

Example 11 includes a resonator fiber optic gyroscope comprising: a crystal waveguide coupler comprising: a polarizing single crystal material having a first crystal lattice axis; a plurality of waveguides formed in the polarizing single crystal material each polarized to guide light having a polarization state aligned to the first crystal lattice axis; a first coupling region within the polarizing single crystal material between a first waveguide and a second waveguide of the plurality of waveguides; and a ring resonator comprising: the second waveguide of the plurality of waveguides; and an optical fiber sensing coil; wherein the second waveguide further comprises a first port coupled to a first end of the optical fiber sensing coil, and a second port coupled to a second end of the optical fiber sensing coil.

Example 12 includes the resonator fiber optic gyroscope of example 11, wherein the polarizing single crystal material comprises a proton exchanged $LiNbO_3$ crystal.

Example 13 includes the resonator fiber optic gyroscope of any of examples 11-12, wherein the first waveguide comprises a bend that approaches the second waveguide defining the first coupling region between the first waveguide and the second waveguide.

Example 14 includes the resonator fiber optic gyroscope of any of examples 11-13, wherein the first waveguide comprises: a first interface configured to input laser light from a first laser light source into the first waveguide, and a second interface configured to output a first reflection port signal from the first waveguide; wherein frequencies of the laser light from the first laser light source are locked to resonance frequencies of the ring resonator based on the first reflection port signal.

Example 15 includes the resonator fiber optic gyroscope of example 14, wherein the optical fiber sensing coil comprises polarization maintaining (PM) fiber; and wherein any laser light from the first laser light source propagating through the optical fiber sensing coil has a polarization state aligned to a polarization state of the first reflection port signal.

Example 16 includes the resonator fiber optic gyroscope of any of examples 11-15, further comprising a second coupling region within the polarizing single crystal material between a third waveguide of the plurality of waveguides and the second waveguide.

Example 17 includes the resonator fiber optic gyroscope of example 16, wherein the third waveguide comprises: a first interface configured to input laser light from a second laser light source into the second waveguide, and a second interface configured to output a second reflection port signal from the second waveguide; wherein frequencies of the laser light from the second laser light source are locked to resonance frequencies of the ring resonator based on the second reflection port signal.

Example 18 includes the resonator fiber optic gyroscope of example 17, wherein the optical fiber sensing coil comprises polarization maintaining (PM) fiber; and wherein any laser light from the second laser light source propagating through the optical fiber sensing coil has a polarization state aligned to a polarization state of the second reflection port signal.

Example 19 includes the resonator fiber optic gyroscope of any of example 16-18, wherein the third waveguide is further configured to output laser light from the first laser light source as a first transmission port signal; and wherein the first waveguide is further configured to output laser light from the second laser light source as a second transmission port signal.

Example 20 includes the resonator fiber optic gyroscope of any of examples 11-19, wherein at least one of the plurality of waveguides further comprises a set of electrodes forming an optical phase modulator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An optical fiber resonator, the resonator comprising:
   a polarizing single crystal material having a first crystal lattice axis;
   a first waveguide formed in the polarizing single crystal material;
   a second waveguide formed in the polarizing single crystal material running parallel to the first waveguide; and
   an optical fiber sensing coil;
   wherein the first waveguide comprises a bend that approaches the second waveguide defining a coupling region between the first waveguide and the second waveguide;
   wherein the first waveguide and second waveguide are polarized to guide light having a polarization state aligned to the first crystal lattice axis; and
   wherein the second waveguide and the optical fiber sensing coil are coupled into a resonator configuration to form a ring resonator, the second waveguide comprising a first port coupled to a first end of the optical fiber sensing coil, and a second port coupled to a second end of the optical fiber sensing coil.

2. The resonator of claim 1, wherein the polarizing single crystal material comprises a proton exchanged $LiNbO_3$ crystal.

3. The resonator of claim 1, wherein the first waveguide comprises a first interface coupled to a first fiber lead and a second interface coupled to a second fiber lead; and
   wherein the second waveguide comprises a third interface coupled to a third fiber lead and a fourth interface coupled to a fourth fiber lead.

4. The resonator of claim 1, wherein the first waveguide comprises:
   a first interface configured to input laser light from a first laser light source into the first waveguide, and
   a second interface configured to output a first reflection port signal from the first waveguide;
   wherein frequencies of the laser light from the first laser light source are locked to resonance frequencies of the ring resonator based on the first reflection port signal.

5. The resonator of claim 4, wherein the optical fiber sensing coil comprises polarization maintaining (PM) fiber;
   wherein any laser light from the first laser light source propagating through the optical fiber sensing coil has a polarization state aligned to a polarization state of the first reflection port signal.

6. The resonator of claim 4, wherein the second interface of the first waveguide is further configured to input laser light from a second laser light source into the first waveguide, and
   wherein the first interface of the first waveguide is further configured to output a second reflection port signal from the first waveguide;
   wherein frequencies of the laser light from the second laser light source are locked to resonance frequencies of the ring resonator based on the second reflection port signal.

7. The resonator of claim 6, wherein the optical fiber sensing coil comprises polarization maintaining (PM) fiber;
   wherein any laser light from the second laser light source propagating through the optical fiber sensing coil has a polarization state aligned to a polarization state of the second reflection port signal.

8. The resonator of claim 1, wherein the polarizing single crystal material supports only one polarization state and one spatial mode for light propagating through the first waveguide and the second waveguide.

9. The resonator of claim 1, further comprising:
   a third waveguide formed in the polarizing single crystal material, wherein the third waveguide comprises a bend that approaches the second waveguide defining a coupling region between the third waveguide and the second waveguide.

10. The resonator of claim 9, wherein the third waveguide comprises:
    a first interface configured to input laser light from a second laser light source into the third waveguide, and
    a second interface configured to output a second reflection port signal from the third waveguide;
    wherein frequencies of the laser light from the second laser light source are locked to resonance frequencies of the ring resonator based on the second reflection port signal.

11. A resonator fiber optic gyroscope comprising:
    a crystal waveguide coupler comprising:
        a polarizing single crystal material having a first crystal lattice axis;
        a plurality of waveguides formed in the polarizing single crystal material each polarized to guide light having a polarization state aligned to the first crystal lattice axis;
        a first coupling region within the polarizing single crystal material between a first waveguide and a second waveguide of the plurality of waveguides; and
    a ring resonator comprising:
        the second waveguide of the plurality of waveguides; and
        an optical fiber sensing coil;
        wherein the second waveguide further comprises a first port coupled to a first end of the optical fiber sensing coil, and a second port coupled to a second end of the optical fiber sensing coil.

12. The resonator fiber optic gyroscope of claim 11, wherein the polarizing single crystal material comprises a proton exchanged $LiNbO_3$ crystal.

13. The resonator fiber optic gyroscope of claim 11, wherein the first waveguide comprises a bend that approaches the second waveguide defining the first coupling region between the first waveguide and the second waveguide.

14. The resonator fiber optic gyroscope of claim 11, wherein the first waveguide comprises:
    a first interface configured to input laser light from a first laser light source into the first waveguide; and
    a second interface configured to output a first reflection port signal from the first waveguide;
    wherein frequencies of the laser light from the first laser light source are locked to resonance frequencies of the ring resonator based on the first reflection port signal.

15. The resonator fiber optic gyroscope of claim 14, wherein the optical fiber sensing coil comprises polarization maintaining (PM) fiber; and
    wherein any laser light from the first laser light source propagating through the optical fiber sensing coil has a polarization state aligned to a polarization state of the first reflection port signal.

16. The resonator fiber optic gyroscope of claim 11, further comprising a second coupling region within the polarizing single crystal material between a third waveguide of the plurality of waveguides and the second waveguide.

17. The resonator fiber optic gyroscope of claim 16, wherein the third waveguide comprises:
a first interface configured to input laser light from a second laser light source into the second waveguide, and
a second interface configured to output a second reflection port signal from the second waveguide;
wherein frequencies of the laser light from the second laser light source are locked to resonance frequencies of the ring resonator based on the second reflection port signal.

18. The resonator fiber optic gyroscope of claim 17, wherein the optical fiber sensing coil comprises polarization maintaining (PM) fiber; and
wherein any laser light from the second laser light source propagating through the optical fiber sensing coil has a polarization state aligned to a polarization state of the second reflection port signal.

19. The resonator fiber optic gyroscope of claim 18, wherein the third waveguide is further configured to output laser light from the first laser light source as a first transmission port signal; and
wherein the first waveguide is further configured to output laser light from the second laser light source as a second transmission port signal.

20. The resonator fiber optic gyroscope of claim 11, wherein at least one of the plurality of waveguides further comprises a set of electrodes forming an optical phase modulator.

\* \* \* \* \*